C. W. LE COUNT.
Expanding Mandrels.
No. 198,633. Patented Dec. 25, 1877.
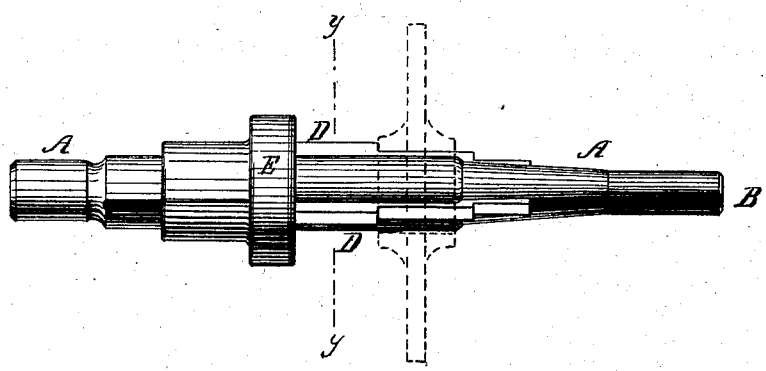
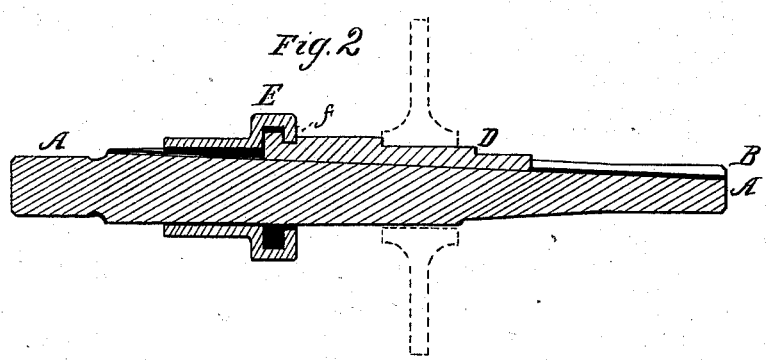
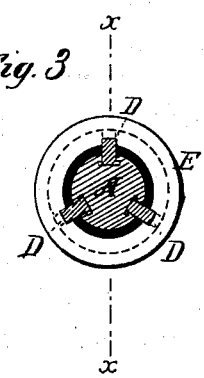
Witnesses
Fred Haynes
L. Allen
Inventor
Charles W. Le Count
by his Attorneys
Brown & Allen

UNITED STATES PATENT OFFICE.

CHARLES W. LE COUNT, OF NORWALK, CONNECTICUT.

IMPROVEMENT IN EXPANDING MANDRELS.

Specification forming part of Letters Patent No. 198,633, dated December 25, 1877; application filed November 15, 1877.

*To all whom it may concern:*

Be it known that I, CHARLES W. LE COUNT, of Norwalk, in the county of Fairfield and State of Connecticut, have invented an Improvement in Expanding Mandrels; and I do hereby declare that the following is a full, clear, and exact description of the same, reference being had to the accompanying drawing, forming part of this specification.

My invention has for its object to supply a much cheaper and more convenient expanding mandrel for lathe-work than has hitherto been furnished; but said expanding mandrel may be applied to other purposes.

My invention is an improvement upon an invention for which Letters Patent No. 55,681 were granted to me June 19, 1866; and it consists in the combination, with an arbor having formed therein inclined bottom grooves, of sliding supports fitted to said grooves for holding the work, and sliding longitudinally in said grooves, and an equalizing-collar, engaging the said sliding supports, said collar sliding longitudinally over said arbor with said supports by its own inertia and the inertia of the said sliding supports when the said arbor is struck upon one end, as hereinafter described.

Figure 1 in the accompanying drawing is a side view of an expanding mandrel made in accordance with my improvement, and shown as supporting a piece of work, indicated in dotted outline. Fig. 2 is a longitudinal section of the same made on the line $x\ x$ in Fig. 3. Fig. 3 is a vertical cross-section of the mandrel made on the line $y\ y$ in Fig. 1.

A is a solid arbor, having formed therein longitudinal grooves B. The bottoms of said grooves B are inclined to the central longitudinal axis of the arbor A, as shown in Fig. 2. In the said grooves B are accurately, but not too tightly, fitted work-supporting slides D. Said work-supporting slides D are, preferably, formed with gibs or flanges on their inner sides, which fit in corresponding undercuts on each side of the bottoms of their respective grooves. Said work-supporting slides D are, moreover, preferably, but not necessarily, formed with steps or ledges upon their outer sides in the smaller sizes of mandrels, by which their capacity for holding various kinds of work is increased. The inner ends of said supporting-slides D have rectangular notches $f$, Fig. 2, cut therein, to which notches is fitted an equalizing slide or collar, E.

Said equalizing slide or collar is, preferably, made in the form of a sleeve, which slides over the exterior of the arbor A; but it may be otherwise formed, and made to engage with the work-supporting slides D in other ways than that hereinbefore specified. Its function, however it may be constructed, is to cause the supporting-slides D to move simultaneously and equally and longitudinally in the grooves B of the arbor A.

To place a piece of work upon the mandrel, the said supporting-slides are slid forward in the inclined grooves until they approach the central axis of the arbor A sufficiently to allow the hole in the piece of work to pass over the exterior of the supporting-slides D. A slight blow with a wooden mallet or soft-metal hammer upon the inner end of the arbor, or that end which enters the mandrel of the head-stock of the lathe, forces said arbor and the said work-supporting slides equally backward relatively to said arbor into portions of their grooves farther removed from the central longitudinal axis of said arbor, thus causing them to move radially outward, and bind against the sides of the hole in the work to be supported by the mandrel, and to hold the same firmly fixed upon said mandrel.

To remove the work from the mandrel a similar blow on the opposite end of the arbor A causes the slides to move equally in an opposite direction, and, therefore, to approach more nearly to the central longitudinal axis of the arbor A, and release the piece of work previously supported by them.

I claim—

The combination, with an arbor, A, having formed therein inclined bottomed grooves B, of sliding supports D, fitted to said grooves, and an equalizing sliding collar, E, engaging with said sliding supports, and sliding with said supports longitudinally over said arbor, substantially as and for the purpose specified.

CHARLES W. LE COUNT.

Witnesses:
EDWARD B. SPERRY,
FRED. HAYNES.